May 31, 1932. W. H. COLLIER 1,861,175
CIRCUIT CONTROL DEVICE FOR AUTOMOBILES
Filed March 3, 1927 2 Sheets-Sheet 1
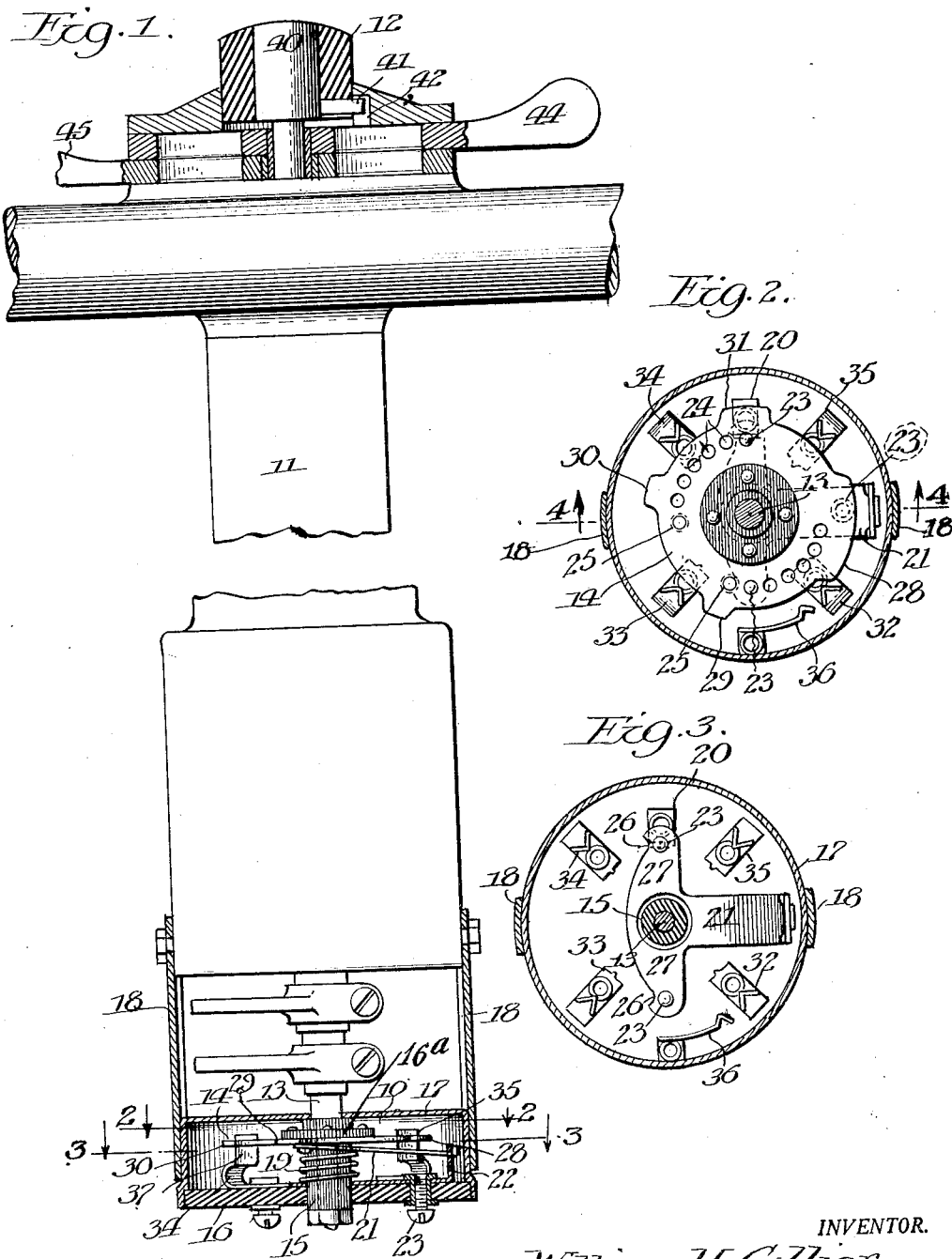
INVENTOR.
William H. Collier
BY Otto M. Vermich
ATTORNEY May 31, 1932.  W. H. COLLIER  1,861,175
CIRCUIT CONTROL DEVICE FOR AUTOMOBILES
Filed March 3, 1927  2 Sheets-Sheet 2

INVENTOR.
William H. Collier
BY Otto M. Nermick
ATTORNEY

Patented May 31, 1932

1,861,175

UNITED STATES PATENT OFFICE

WILLIAM H. COLLIER, OF CHICAGO, ILLINOIS, ASSIGNOR TO PINES WINTERFRONT COMPANY, OF CHICAGO, ILLINOIS, A CORPORATION OF DELAWARE

CIRCUIT CONTROL DEVICE FOR AUTOMOBILES

Application filed March 3, 1927. Serial No. 172,279.

The invention relates to control devices, and particularly to devices of this character which are designed for association with the steering post of a vehicle and embody means whereby certain circuits may be controlled from adjacent the steering wheel of the vehicle.

The invention has as its prime object the provision of a simplified construction whereby certain circuits and devices connected therewith may be actuated or rendered inoperative without interfering with the operation of another circuit having means associated therewith which it may be desirable to actuate independent of the first mentioned circuits.

It is a further object of the invention to employ a lock for locking the various circuits and devices associated in said circuits in an inoperative condition.

The invention has as an additional object the provision of an element operable from adjacent the steering wheel of the vehicle for controlling certain circuits and devices such as for instance the ignition and lighting circuits, permitting the actuation of an alarm circuit regardless of the position of said element relative to certain contacts of said ignition and lighting circuits with which said element is adapted to be connected, thereby permitting the operation of an alarm circuit without interfering with the operation of any of the other circuits.

The invention also has as an object the provision of an element such as that above referred to, which is rotatable into various positions to control circuits such as the ignition and lighting circuits, and is bodily movable in a transverse direction from any of its positions of rotation into contact with a contact element to complete an alarm circuit.

It is also an object to employ the alarm or horn button of the vehicle as a means for causing both rotative and transverse movement of said element.

The invention has these and other objects, all of which will be explained in detail and more readily understood when read in conjunction with the accompanying drawings which illustrate one embodiment of which the invention is susceptible, it being obvious that changes and modifications may be resorted to without departing from the spirit of the invention as expressed in the appended claims forming a part hereof.

In the drawings,

Fig. 1 is a view showing a steering post of a vehicle having the invention applied thereto;

Fig. 2 is a section taken on line 2—2 of Fig. 1;

Fig. 3 is a section taken on line 3—3 of Fig. 1;

Fig. 6 is a central section illustrating a modified construction which may be resorted to.

Figure 4:
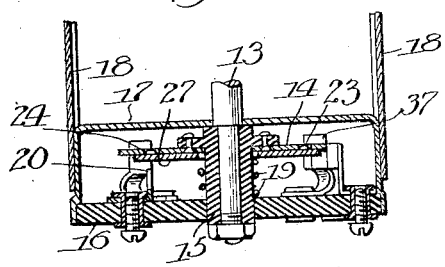
Fig. 4 is a section taken on line 4—4 of Fig. 2.
Figure 5:
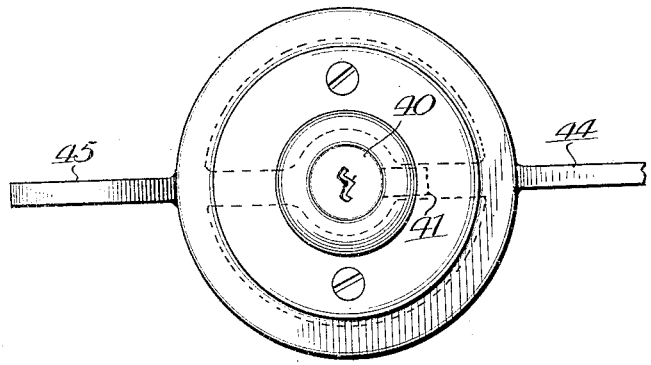
Fig. 5 is a plan view showing the alarm or horn button and the lock for locking the same against rotation.

The structure illustrated in Fig. 1 for accomplishing the various functions above referred to includes a switching or control device, generally designated 10, located and secured to the lower end of the steering post housing 11, and a button 12 located adjacent the steering wheel of the vehicle, the button being mounted for both rotative and reciprocable motion to actuate the controlling device 10. The button 12 and the switch or circuit control device generally designated 10 are connected together through the medium of a rod 13 which has one end connected to the button and the other to an element 14 of the switch, which element is capable of both rotative and reciprocable movement into and out of engagement with certain contacts which respectively control the ignition and lighting circuits of the vehicle. This element 14 is, as before stated, connected for both rotative and reciprocable motion by the horn button, and to this end said element 14 is secured to the rod 13, it being fastened thereto by means of the insulating bushing 15 having the enlargement or head 16ª, the bushing being mounted upon the reduced end of said rod. The bushing 15 is rotatably and transversely movable in the insulating disc 16, which with the casing 17 forms a housing in which the various elements of the control device are housed. The housing thus formed is attached to the steering post housing by means of the arms 18—18.

The contact element 14, bushing 15, rod 13, and button 12 are held in an elevated condition through the means of a coiled spring 19 which reacts between the contact element 14 and the disc 16 and will thus allow the contact element 14 to be depressed from its normal position, as shown in Fig. 1, to a lowered position into engagement with the horn contact 20 upon actuation of the button 12. The coiled spring engages an end of an element 21 which engages the contact element 14 and is clearly shown in Fig. 3, and has its opposite end hingedly connected with an upstanding part 22 which is part of a contact strip to which a battery terminal 23 is connected, the latter being mounted in the insulating disc 16. From this it is evident that current is supplied to the contact element 14. The element 21 provides one part of a detent and stop for the rotatable contact element 14, and to this end the element 21 is provided with projections 23—23 which engage the annularly arranged apertures 24 provided in the rotatable contact element 14 upon adjustment or rotation of said element to hold the latter in any of its adjusted positions of rotation. The contact element 14 is further provided with the spaced projections or stops 25 which project downwardly from the element 14 into the plane of the element 21 so that said projections 25 will be engaged by the recesses 26 provided in the ends of the arms 27—27 of element 21 upon rotation of the contact element and thereby limit the degree of rotation thereof.

The contact element 14 is provided with a plurality of peripheral projections respectively designated 28, 29, 30 and 31, which are designed to consecutively engage the contact elements 32, 33, 34 and 35 upon rotation of the contact element 14. The projection 28 and the contact 32 are designed to engage each other to control the ignition circuit of an internal combustion engine. The remaining contacts, such as 33, 34, 35 and 36, control the various lighting circuits, such as the head, tail and parking light circuits. It is manifest that when the contact element 14 is rotated a distance corresponding to that existing between a pair of the apertures 24, the peripheral projection 28 is brought into engagement with the contact element 32 which will thus close the ignition circuit, through the terminal 23, element 21, contact element 14 and terminal 32. It will be noted that when the contact element 14 is in this last named positioned, that the circuits connected with the several contacts 33, 34 and 35 are open and thus the ignition circuit may be opened or closed without affecting the various lighting circuits.

It will also be noted that the several contacts 32 to 36 have vertically extending, elongated portions, such as 37, and are thus constructed to allow the contact element 14 to be depressed without affecting the connection between said contacts and the contact member 14.

By referring to Fig. 4, it will be seen that the contact 20, which is connected to the horn or alarm circuit, is arranged in the path of movement of the contact element 14 when the latter is depressed, and thus, because of the elongated character of the contacts 32 to 36, the horn may be sounded without affecting the condition of the various circuits when the contact element 14 is arranged to close the same.

As before stated, the peripheral projection 28 is of a somewhat greater length than the remaining projections and is thus formed to insure operation of the ignition circuit when the contact element 14 is arranged to contact with other contact elements such as 33 to 36. Upon rotation of the contact element 14, the distance between a pair of apertures 24, the ignition circuit is closed. Upon further rotation of the contact element 14, the projection 28 engages the contact 36 which is connected with the tail light circuit, and thus this circuit and the ignition circuit are closed through contact between the projection 28 and the contacts 32 and 36. Upon rotation of the contact member to the position just mentioned, the projection 25 engages the contact element 33, and by virtue of the fact that this last named contact is connected with the dimmer head light circuit, said last mentioned, tail light and ignition circuits are closed.

Upon a further rotation of the rotatable contact element 14, the dimmer circuit is broken and contact is made between the contact 34 and projection 30, causing a bright light circuit to be closed, however without affecting either the ignition or tail light circuits, as it is manifest that the projection 28 is of a sufficient length to insure contact between the contacts 32 and 36.

When the contact member 14 is again rotated to bring the projection 31 into contact with the contact element 35, the bright light circuit is broken and the cowl or parking light circuit is brought into operation, it being understood that the contact 35 is connected with a parking light circuit such as is now employed. The projection 31, it will be noted, is of a slightly greater length than either of the projections 29 or 30, and thus will allow additional rotation of the contact element 14 without breaking the circuit formed between the projection 31 and the contact 35.

The projection 31 is of this increased length to allow the elongated projection 28 to be moved to break the connection between it and the contact element 32 of the ignition circuit, yet maintain its connection with the contact 36 and thus leave the tail light circuit closed, permitting the parking and tail lights to be illuminated with the ignition and other circuits broken.

By virtue of the fact that the horn contact is at all times in the path of movement of the contact element 14, it is manifest that the circuit connected therewith may be closed upon depression of said element 14 in any of its positions of rotation including one in which all of the remaining circuits are open.

The horn button 12 is provided with a key controlled lock 40 having a bolt 41 which is operable to move into and out of a recess 42 provided in the cap 43 which surmounts the throttle and spark levers 44 and 45 and assists to hold them in associated relation to the steering post of the vehicle. The recess 42 is of an elongated character and is thus formed to allow the button 12 to be depressed to sound a warning even though the button is locked against rotation. From the foregoing description of the structure, it is manifest that upon rotation of the horn button, the various circuits are opened and closed, and that the horn may be sounded with said circuits in either condition, and also that the horn may be actuated even though the remaining mechanism is locked against rotation.

Figure 6:
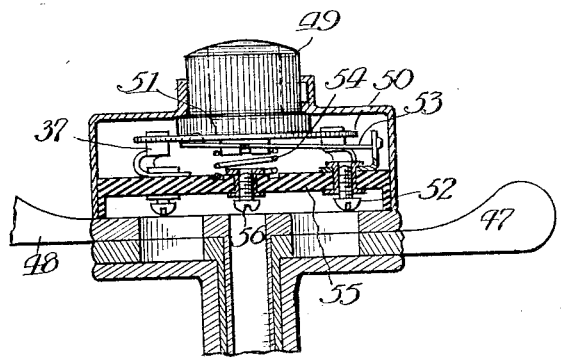

In Fig. 6, a modified construction is illustrated which provides a construction whereby the entire mechanism may be located and connected to the head of the steering post. In the structure the rod 13 is entirely dispensed with and the conductors leading from the various contacts are passed through the center of the tubes to which the throttle and spark levers 47 and 48 are respectively connected. In this construction, the horn button 49 has a contact element 50, corresponding to the contact element 14, directly connected thereto by means of the screw 51. A terminal 52, to which the conductor leading to a source of current is connected, is also provided which is connected with the contact element 50 through the medium of the contact member 53, this member and the button 49 being held in an elevated condition by means of the coiled spring 54 which extends between the contact element 50 and the insulating piece 55. A contact 56 is mounted in the insulating piece 55 below the screw 51. This contact 56 is connected with the horn or alarm circuit, and thus as the button is depressed it contacts with the terminal 55 and closes this circuit. The contact element 50 may be formed as explained in connection with the structure shown in Figs. 1 to 4, and the contacts with which said element co-operates may be arranged in the same manner and, therefore, this structure will not again be explained in detail. The button may also be provided with a lock to lock it against rotation and axial movement.

Figure 7:
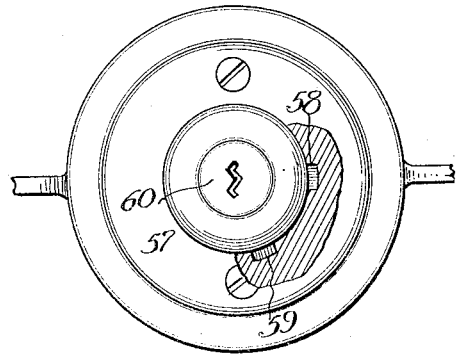
Fig. 7 is a plan view showing part of another locking means.

The structure illustrated in Fig. 7 discloses an arrangement in which the contact element, such as 14, may be rotated to different positions by the button and be locked in either of said positions against rotation and also axial movement of said element. The arrangement is particularly adapted to allow the contact element 14 to be rotated to lock the parts of the ignition and alarm circuits against operation, permitting operation of a lighting circuit. To accomplish this feature, the cap 57 is provided with the recesses 58 and 59 for the reception of the bolt of the lock 60. The recess 58 is so arranged that when the bolt is inserted therein, all of the circuits are locked against operation and when located in the recess 59, all circuits except certain of the lighting circuits such as the tail and parking light circuits are rendered inoperative.

From the foregoing description it is evident that a simple structure is provided whereby various circuits may be controlled upon rotation of the horn button and that the horn button may be actuated to sound an alarm when in either a free or locked condition.

While the device is herein shown and described as controlling only the ignition, lighting and alarm circuits, it is evident that the structure is susceptible of changes so that it may control these as well as other circuits.

Having thus described the invention, what I claim as new and desire to cover by Letters Patent is:

1. In a device of the class described, the combination of a rotatable and reciprocable rod, a contact member fixedly mounted thereon, an element in which said rod is mounted, contacts extending therefrom, said contact member having a plurality of peripheral projections adapted to contact with the contacts of said member in which the rod is mounted, said contact member mounted upon said rod being provided with a plurality of annularly arranged portions forming part of a holding means to hold said member in various positions of rotation, elements extending from said contact member, and a yieldable fixedly mounted holding element for co-operating with said portions and said elements extending from said contact member.

2. In a device of the class described, the combination of a rotatable and reciprocable shaft, a contact disc having apertures formed therein fixed to said shaft and rotatable and reciprocable therewith, and a current carrying member engaging with said contact disc, said current carrying member having projections which ride into said apertures to provide stops for positively positioning the contact disc when rotated to obtain a selective electrical connection.

3. In a device of the character described, the combination of a rotatable and reciprocable shaft, and a contact disc fixed to said shaft, said contact disc having a plurality of apertures to selectively engage projections on a current carrying member, said apertures providing selective stops for said contact disc as it is rotated to form a plurality of connections.

4. In a device of the character described, the combination of a rotatable and reciprocable shaft, a contact disc having a plurality of apertures fixed to said shaft, a current carrying member, means for holding said current carrying member in close relationship with said contact disc, and projections formed on said current carrying member adapted to engage said apertures, said apertures providing selective stops by their engagement with said projection as the contact disc is rotated to make a plurality of selective connections.

5. A device of the character described comprising a rotatable and reciprocable shaft, a contact disc having a plurality of apertures fixed to said shaft, a housing in which said contact disc is rotatable and reciprocable, contacts extending from said housing into the plane of said contact disc, peripheral projections on said contact disc, said projections forming successive connections with said contacts upon rotation of the contact disc, a current carrying member, means for holding said current carrying member in frictional relationship with said contact disc, and projections on said current carrying member adapted to engage successively said apertures formed in said contact disc upon the rotation thereof.

6. A device of the character described comprising a rotatable and reciprocable shaft, a contact disc having a plurality of apertures fixed to said shaft, a current carrying member, means for holding said current carrying member in frictional relationship with said contact disc, and projections having rounded ends extending from said current carrying member into partial engagement with said apertures whereby a slight camming action is required to release said engagement, said engagement providing positive stops for the contact disc as it is rotated to obtain selective connections.

7. A device of the character described comprising a rotatable and reciprocable shaft, a contact disc having a plurality of apertures fixed to said shaft, means for holding a hinged current carrying member in frictional engagement with said contact disc, means for obtaining selective connections upon rotation of said contact disc, means for forming a connection upon reciprocation of said contact disc without disturbing the connections formed in rotation of said disc, and projections on said current carrying member adapted to partially engage said apertures, said apertures and projections forming a series of selective positive stops in the rotation of the contact disc.

8. A device for the character described comprising a rotatable and reciprocable shaft, a contact disc having a plurality of apertures fixed to said shaft, a housing in which said contact disc is rotatable and reciprocable, contacts in said housing extending into the path of projections on said contact disc, said projections and said contacts forming selective connections upon rotation of said contact disc, means for maintaining certain connections while other connections are made and broken and means for maintaining all connections when said contact disc is reciprocated, a current carrying member, and rounded projections on said current carrying member, said projections being by spring pressure held in slight engagement with said apertures to form positive stops.

9. In a device of the character described comprising a rotatable and reciprocable shaft fixed to said shaft, a spring, a contact disc having a plurality of apertures formed therein to successively engage rounded projections on a current carrying member, said current carrying member being held into engagement with said contact disc by said spring so that a slight camming action is required to release the engaged members from engagement as the contact disc is rotated to form selective connections, means for retaining certain connections while other connections are made and broken, means for retaining connections wherever said shaft is reciprocated, and means for limiting the rotation of said disc.

10. In a device of the character described, comprising a member having contact elements, a rod reciprocally mounted in said member, a contact member having a plurality of apertures carried by said rod, a spring arranged between said members, said contact members carried by said rod being rotatable into and out of connection with the contacts of said first mentioned member, and a yieldable detent having projections thereon, said projections being held by said spring into engagement with said apertures in such manner that a camming force is required against said spring pressure to rotate the contact member with respect to the detent.

11. In a device of the character described comprising a steering column, a reciprocable and rotatable shaft carried by said steering column, a casing through which said shaft protrudes, a contact disc having apertures formed therein fixed to said shaft, a yieldable detent pressed into engagement with said contact disc by a spring arranged between said casing and said contact disc, and projections on said detent selectively engageable with said apertures, said engagement being yieldable as said contact disc is rotated to obtain a selective electrical connection.

12. In a device of the character described comprising a reciprocable and rotatable shaft, means for locking said shaft against rotation without interfering with the reciprocation thereof, a contact disc having a plurality of apertures fixed to said shaft, a current carrying member having projections thereon, and means for pressing said current carrying member against said contact disc said projections riding into said apertures as the contact disc is rotated to obtain a plurality of electrical connections.

13. In a device of the character described comprising a reciprocable and rotatable shaft, a contact disc having a plurality of apertures fixed to said shaft, a casing having a plurality of contacts in which said contact disc is mounted, a plurality of projections on said contact disc selectively engageable with said contacts upon rotation of said contact disc, a current carrying member having projections engageable with said apertures to provide positive stops for said contact disc during the rotation thereof, means for forming a connection upon reciprocation of said contact disc without disturbing the connections formed in the rotation thereof, and means for locking said contact disc against rotation without locking said contact disc against reciprocation.

In witness whereof I hereunto subscribe my name this 25th day of February, A. D. 1927.

WILLIAM H. COLLIER.